US006860397B1

United States Patent
Walters, Jr.

(10) Patent No.: US 6,860,397 B1
(45) Date of Patent: Mar. 1, 2005

(54) EASY OPEN CONTAINER CLOSURE

(76) Inventor: Lawrence S. Walters, Jr., 505 Amity Rd., Woodbridge, CT (US) 06525

(*) Notice: Subject to any disclaimer, the term of this patent is extended or adjusted under 35 U.S.C. 154(b) by 0 days.

(21) Appl. No.: 09/579,050

(22) Filed: May 26, 2000

Related U.S. Application Data

(60) Provisional application No. 60/136,332, filed on May 26, 1999.

(51) Int. Cl.$^7$ .......................... B65D 41/16; B65D 41/22
(52) U.S. Cl. ...................... 215/305; 215/304; 215/317; 215/324; 220/281; 220/793
(58) Field of Search .................................. 215/395, 201, 215/303–305, 317, 319, 324, 301, 295, 321; 220/281, 285, 287, 793, 262, 282, 283

(56) References Cited

U.S. PATENT DOCUMENTS

| | | | | |
|---|---|---|---|---|
| 2,750,062 A | * | 6/1956 | Satz | 215/305 |
| 2,778,520 A | * | 1/1957 | Hyde, Jr. | 215/253 |
| 3,204,813 A | * | 9/1965 | McCuskey et al. | 220/792 |
| 3,425,580 A | * | 2/1969 | Brockhage | 215/305 |
| 3,603,473 A | * | 9/1971 | Winberg | 215/250 |
| 3,794,207 A | * | 2/1974 | Hunt | 215/304 |
| 3,927,796 A | * | 12/1975 | Whitehouse | 220/281 |
| RE28,862 E | | 6/1976 | Siemonsen et al. | |
| 4,326,649 A | * | 4/1982 | Marino et al. | 220/281 |
| 4,409,864 A | | 10/1983 | Gaskins | |
| 4,431,111 A | | 2/1984 | Prohaska | |
| 4,433,597 A | | 2/1984 | Rowland | |
| 4,564,116 A | | 1/1986 | Prohaska | |
| 4,633,740 A | | 1/1987 | Jacobs | |
| 4,653,354 A | | 3/1987 | Clapp | |
| 4,679,697 A | | 7/1987 | Allaire | |
| 4,702,130 A | | 10/1987 | Davis | |
| 4,703,867 A | * | 11/1987 | Schoenhard | 220/86.2 |
| 4,756,442 A | * | 7/1988 | Halm et al. | 220/254.2 |
| 4,852,432 A | | 8/1989 | Rodriquez Salcedo | |
| 4,864,898 A | | 9/1989 | Tricinella | |
| 4,949,600 A | | 8/1990 | Tricinella | |
| 4,951,829 A | * | 8/1990 | Hsu | 215/305 |
| 4,967,622 A | | 11/1990 | Phillips | |
| 4,976,172 A | | 12/1990 | Thomas et al. | |
| 5,251,770 A | * | 10/1993 | Bartley et al. | 215/305 |
| 5,265,501 A | | 11/1993 | Reyes | |
| 5,265,746 A | * | 11/1993 | Lee | 215/295 |
| 5,265,748 A | | 11/1993 | Furukawa | |
| 5,267,494 A | | 12/1993 | Waluda | |
| 5,722,568 A | * | 3/1998 | Smith | 220/281 |
| 6,299,005 B1 | * | 10/2001 | Higgins | 215/237 |

* cited by examiner

Primary Examiner—Lee Young
Assistant Examiner—Niki M. Eloshway
(74) Attorney, Agent, or Firm—Ohlandt, Greeley Ruggiero & Perle

(57) ABSTRACT

The present invention provides a container closure with a handle, wherein the handle acts as a lever when squeezed against the neck of the container. The force on the lever handle is transferred to the container closure forcing a portion of the closure to slip over the bead of the container and release the closure's hold on the container's top. Once the closure's hold is released, the closure is easily removed from the container. The closure is reusable and can be replaced over the container opening to secure the container's contents for storage or transport.

13 Claims, 1 Drawing Sheet

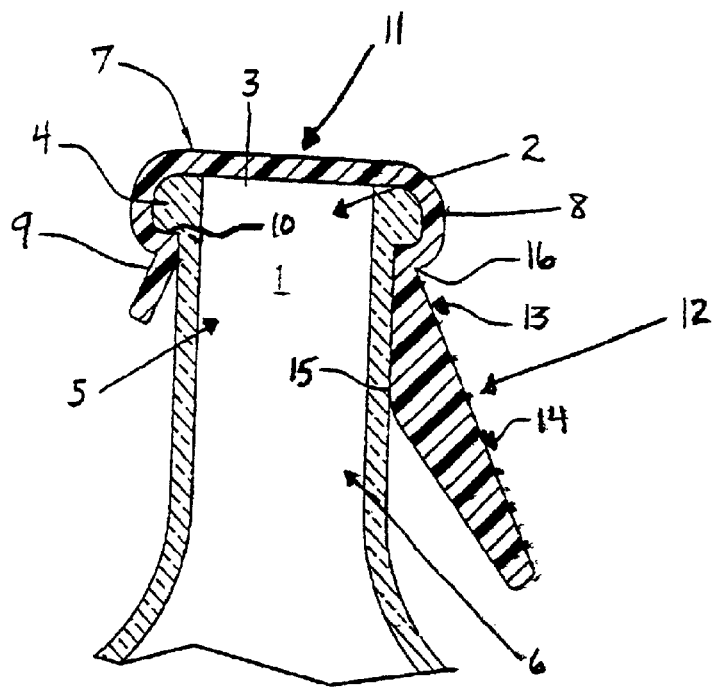
FIG. A
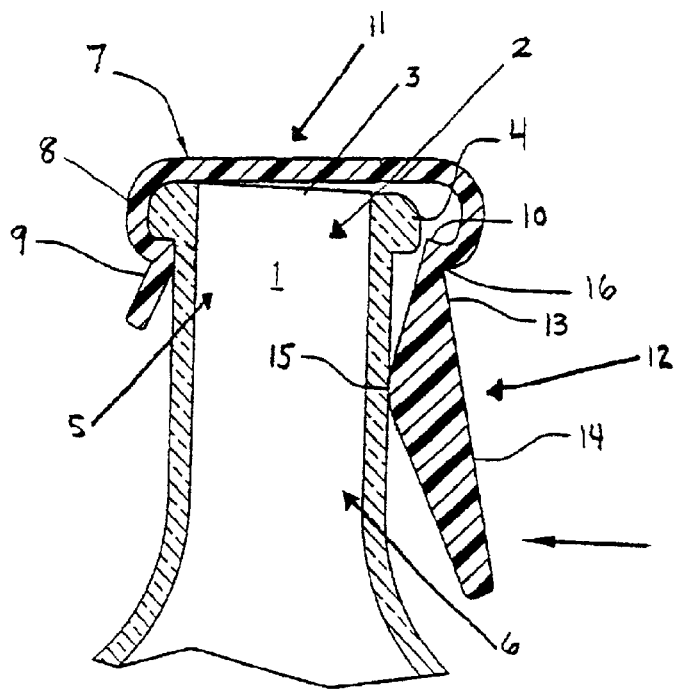
FIG. B

EASY OPEN CONTAINER CLOSURE

The present invention is based on U.S. Provisional Patent Application No. 60/136,332, filed on May 26, 1999.

The present invention relates generally to an improved container closure. More particularly, the present invention relates to a container closure with a handle, wherein the handle acts as a lever when squeezed against the neck of the container. The force on the lever handle is transferred to the container closure, forcing a portion of the closure to disengage the bead of the container and release the closure's hold on the container. Once the closure's hold is released, the closure is easily removed from the container. The closure is reusable and can be replaced over the container opening to secure the container's contents for storage or transport.

BACKGROUND TO THE INVENTION

Container closures, such as bottle caps, are typically composed of a circular piece of die stamped steel or other suitable metal that is crimped over the top lip or bead of a bottle. Typically, the cap is removed with a tool that grabs a portion of the lower edge of the bottle c-cap, lifting it outward and upward. This movement has the effect of distorting the crimped portion and bottom edge of the cap, and often bends the top of the cap in such a way as to permanently crease it into a shape that prevents it from being reused. This technology is quite old and well established. A more recent improvement involves the twist off bottle cap similar to the threaded lid on a jar.

Removing a cap from a bottle often requires a separate tool and two hands, one to hold the bottle and the other to manipulate the opener. This bottle opener may be permanently affixed to a wall or a machine, thereby requiring the use of only one hand, but still such a tool is needed. One common feature of nearly all bottle cap removers is the similarity in which they operate. Whether they employ a single lever with a hooked edge for engaging the bottom of the bottle cap, or a more elaborate structure, each bottle cap remover is a separate device that is brought in contact with the cap to pry the cap outward and off in an upward direction. Once the cap is removed, it is usually deformed and unsuitable for reuse.

Waluda discloses in U.S. Pat. No. 5,267,494 a bottle cap opener separate from the bottle cap that is fashioned into a key.

Reyes discloses in U.S. Pat. No. 5,265,501 a bottle cap opener separate from the bottle cap and a collection method that is affixed to a vertical surface.

Thomas, et al. discloses in U.S. Pat. No. 4,976,172 a bottle cap opener separate from the bottle cap that also incorporates a key ring for holding keys.

Phillips discloses in U.S. Pat. No. 4,967,622 a multi-function beverage container opener that is separate from the bottle cap and which incorporates a number of methods for opening a variety of different beverage containers.

Tricinella discloses in U.S. Pat. No. 4,949,600 a bottle cap opener separate from the bottle cap with a specialized edge for engaging the lower edge of the bottle cap.

Tricinella discloses in U.S. Pat. No. 4,864,898 a bottle cap opener separate from the bottle cap and similar in design and function to the device disclosed by Tricinella in U.S. Pat. No. 4,949,600.

Rodriquez Salcedo discloses in U.S. Pat. No. 4,852,432 a bottle cap opener separate from the bottle cap, which involves a "U" shaped head for wrapping around the bottle neck, a handle, and a magnetic appendix with a hinged structure for lifting the cap off the bottle.

Davis discloses in U.S. Pat. No. 4,702,130 a bottle cap remover separate from the bottle cap which involves two levers and is capable of preserving the integrity of the removed crown cap.

Clapp discloses in U.S. Pat. No. 4,653,354 a method for making a bottle cap remover separate from the bottle cap which involves sintering compressed powdered metal in a die at high heat.

Jacobs discloses in U.S. Pat. No. 4,633,740 a bottle cap remover separate from the bottle cap which is capable of removing twist-off caps and crown caps.

Rowland discloses in U.S. Pat. No. 4,433,597 a bottle cap remover separate from the bottle cap which is designed to twist or pry-off tapered caps.

Gaskins discloses in U.S. Pat. No. 4,409,864 a bottle cap remover separate from the bottle cap which employs a handle and cantilever arms with hooks for engaging the bottle cap under the cap's peripheral lip.

There are also a number of changes disclosed to the bottle cap itself. Lee discloses in U.S. Pat. No. 5,265,748 a bottle cap with an integrated remover affixed to the side of the cap at the cap's bottom edge. The cap is removed by lifting the opener or tab up over the cap, which has the effect of lifting the cap at that edge. This opener acts as a lever and uses the side of the cap as a fulcrum, which has the effect of pulling that edge of the cap upward and off the bottle. This action deforms the cap upon removal and prevents the cap from being effectively reused.

Allaire discloses in U.S. Pat. No. 4,679,697 a bottle cap with a defined line of weakness that allows the cap to crease at that line upon removal. Once the creased crown cap is removed, it is not easily reusable.

Prohaska discloses in U.S. Pat. No. 4,564,116 a unique bottle closure cap with a side wall of elastomeric material and an integrated rip tab formed as part of the side wall. A pull on the rip tab allows the cylindrical wall to tear approximately halfway around the closure cap and permits the cap to be removed.

Prohaska discloses in U.S. Pat. No. 4,431,111 another bottle cap closure and removal system similar to the device disclosed in U.S. Pat. No. 4,564,116.

Siemonsen discloses in U.S. Pat. No. Re. 28,862 a bottle cap with a tear section on the cap, and a ring pull tab to tear away a selected section.

SUMMARY OF THE INVENTION

The present invention provides a container closure with a handle, wherein the handle acts as a lever when squeezed against the neck of the container. The force on the lever handle is transferred to the container closure forcing a portion of the closure to slip over the bead of the container and release the closure's hold on the container's top. Once the closure's hold is released, the closure is easily removed from the container. The closure is reusable and can be replaced over the container opening to secure the container's contents for storage or transport.

DESCRIPTION OF THE DRAWINGS

FIG. A is a schematic view of the neck of a bottle with the closure apparatus in the closed position.

FIG. B is a schematic view of the neck of a bottle with the closure apparatus in the open position.

DETAILED DESCRIPTION OF THE PREFERRED INVENTION

The container closure according to the present invention is best illustrated by reference to FIGS. A & B. Assuming a bottle neck 1 with a terminal end generally represented as 2, an upper neck portion 5 and a lower neck portion 6. The terminal end 2 has an orifice 3 and a bead 4 for securing a cap portion 11. The cap portion 11 has attached to it a lever handle 12. The handle 12 is attached to the skirt 9 and is fashioned in such a way as to contact the outer surface of the upper portion of the bottle neck 5. The fulcrun portion 15 of the handle 12 forms a fulcrum for the transfer of force. The lower handle portion 14 at the fulcrum portion 15 departs sharply down and away from the bottle neck lower portion 6, providing a gap between the lower handle portion 14 and the bottle neck lower portion 6 for the movement of the handle 12 during the opening process. The upper handle portion 13, where it attaches to skirt 9, must be strong and must contact an appropriate amount of the circumference of skirt 9 to have the effect of disengaging enough of peripheral lip 10 from bead 4 when the lower handle portion 14 is depressed towards the bottle neck lower portion 6.

Cap 11 has a top panel 7 with a peripherally depending side wall 8. The side wall 8 conforms to the shape of the bead 4 and extends under the bead 4 forming a peripheral lip 10 which engages the bottom of the bead 4, securing the cap 11 to the bottle neck 1. The skirt 9 is attached to side wall 8 and extends radially downward away from the upper bottle neck portion 5.

The cap 11 could be fashioned out of steel, aluminum, or fiberglass, but most preferably would be made from a strong plastic material. This plastic must be strong enough to withstand general use and handling, as well as any typical pressures emanating from the contents of the bottle, but flexible enough to slip over the bead 4 of the bottle neck 1. The handle 12 must be strong and must contact a sufficient portion of the bottle neck upper portion 5 to provide the support and strength necessary to disengage the cap 11 and not deform the handle 12.

Referring to FIG. B, to remove cap 11 from bottle neck 1, the user would hold the bottle by the neck and with one or more fingers, or with the palm of the same hand which is holding the bottle, squeeze the lower handle portion 14 toward the bottle neck lower portion 6. The pressure on handle 12 would exert a strong force at fulcrum portion 15 against the bottle neck 1 forcing the upper handle portion 13 away from the bottle. The outward and upward pressure on the upper handle portion 13 would cause a similar force to be exerted on that portion of the skirt 9 at point 16 causing that portion of the side wall peripheral lip 10 to disengage the bead 4. Once the peripheral lip 10 is free from the bead 4, either hand could easily remove the cap 11.

Since cap 11 is not deformed during the removal process it can be reused by firmly pressing it down over the bead 4 until the peripheral lip 10 engages the bottom of the bead 4. This process of removing and reusing the cap 11 numerous times could continue at the discretion of user.

Although referred to for illustration purposes as a bottle and a bottle cap, the present invention would also apply to jars and other containers seeking to employ the convenience and economy of a reusable cap system with rapid removal and reattachment.

While the invention has been described in combination with embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. An easy open, reusable, removable closure apparatus for a container having a terminal end with an orifice and a radially outwardly extending bead having an outer surface and a radially outwardly extending undercut, the closure apparatus comprising:

a cap portion having a top, a peripherally depending side wall comprising an inner surface that conforms to said bead outer surface and a radially inwardly extending peripheral lip that simultaneously engages an entire circumference of said bead undercut sealably securing said closure to said container, wherein a material housed by said container is secured in said container by said cap portion; and a handle depending from said cap portion, said handle comprising a fulcrum portion that abuts an outer surface of said container neck.

2. The easy open closure apparatus in claim 1, wherein said cap portion further comprises a peripherally depending skirt, wherein said skirt communicates and depends from said side wall lip and extends radially downward away from said container.

3. The easy open closure apparatus in claim 1, wherein said handle further comprises an upper portion and a lower portion, and wherein said fulcrum portion is disposed between said upper and lower portions.

4. The easy open closure apparatus in claim 3, wherein said handle upper portion comprises an inner surface and an outer surface.

5. The easy open closure apparatus in claim 4, wherein said inner surface abuts an outer surface of said container over an extended length wherein said inner surface is substantially vertical relative to the plane of said top.

6. The easy open closure apparatus in claim 3, wherein said handle lower portion communicates and depends from said handle upper portion and further comprises an inner surface and an outer surface.

7. The easy open closure apparatus in claim 3, wherein said handle lower portion radiates outward from said container such that a gap is formed there between.

8. The easy open closure apparatus in claim 3, wherein upon application of pressure to an outer surface of said lower handle portion, the side wall lip is lever-action disengaged from the bead undercut.

9. The easy open closure apparatus in claim 1, wherein said apparatus is comprised of a material selected from the group consisting of metal, plastic, fiberglass, and composites thereof.

10. The easy open closure apparatus in claim 9, wherein said material allows said cap portion to temporarily deform, allowing said cap portion to disengage said bead and be re-secured to said bead, said cap portion always returning to its original form.

11. The easy open closure apparatus in claim 9, wherein said material avoids deformation of a first handle portion and a second handle portions while pressed.

12. A method of opening a container using the easy open, reusable, removable closure apparatus for a container having a terminal end with an orifice and a radially outwardly extending bead having an outer surface and a radially outwardly extending undercut, the closure apparatus comprising:

a cap portion having a top, a peripherally depending side wall having a radially inwardly extending peripheral lip that simultaneously engages an entire circumference of said bead undercut sealably securing said closure to said container, wherein a material housed by said container is secured in said container by said cap portion; and a handle depending from said cap portion, said handle further comprising an upper portion, a lower portion, and a fulcrum portion there between said upper and lower portions, wherein said fulcrum portion abuts an outer surface of a container neck; the method comprising the steps of:

holding said container and the lower handle portion of said handle with at least one hand; and depressing said lower handle portion toward said container until said peripheral lip disengages said bead undercut.

13. A method of reusing the easy open, reusable, removable closure apparatus for a container having a terminal end with an orifice and a radially outwardly extending bead having an outer surface and a radially outwardly extending undercut, the closure apparatus comprising:

a cap portion having a top, a peripherally depending side wall having a radially inwardly extending peripheral lip that simultaneously engages an entire circumference of said bead undercut sealably securing said closure to said container, a material housed by said container is secured in said container by said cap portion; and a handle depending from said cap portion, said handle further comprising an upper portion, a lower portion, and a fulcrum portion there between said upper and lower portions, wherein said fulcrum portion abuts an outer surface of a container neck; the method comprising the steps of:

providing a container; and pressing said cap portion of the easy open closure apparatus firmly down over said bead until said peripheral lip engages said bead undercut.

* * * * *